(12) United States Patent
Keates

(10) Patent No.: US 9,620,745 B2
(45) Date of Patent: Apr. 11, 2017

(54) CONTOURED BATTERY

(71) Applicant: Intel Corporation, Santa Clara, CA (US)

(72) Inventor: Andy Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 14/330,233

(22) Filed: Jul. 14, 2014

(65) Prior Publication Data

US 2016/0013456 A1   Jan. 14, 2016

(51) Int. Cl.
*H01M 10/04*   (2006.01)
*H01M 4/78*   (2006.01)
*H01M 2/02*   (2006.01)

(52) U.S. Cl.
CPC ......... *H01M 2/0202* (2013.01); *H01M 10/04* (2013.01); *H01M 2002/0205* (2013.01)

(58) Field of Classification Search
CPC ....... H01M 2/0202; H01M 2002/0205; H01M 10/04; H01M 2/0225; H01M 2/0235; H01M 4/78
USPC .......................... 429/163; 29/2, 623.1–623.5
See application file for complete search history.

(56) References Cited

U.S. PATENT DOCUMENTS

| 4,151,331 A | * | 4/1979 | Hug | ......... H01M 4/73 429/228 |
|---|---|---|---|---|
| 2004/0115530 A1 | * | 6/2004 | Maeda | ..... H01M 4/16 429/217 |
| 2009/0214956 A1 | | 8/2009 | Prieto | |
| 2011/0311877 A1 | * | 12/2011 | Matsuda | ............... H01M 4/742 429/241 |
| 2013/0196235 A1 | | 8/2013 | Prieto | |

OTHER PUBLICATIONS

U.S. Appl. No. 14/229,530, filed Mar. 28, 2014, entitled "Method for Providing A Sealing Compound on A Battery Cell," by Andy Keates.

* cited by examiner

*Primary Examiner* — James Lee
(74) *Attorney, Agent, or Firm* — Trop, Pruner & Hu, P.C.

(57) ABSTRACT

In an embodiment, an apparatus includes a battery shaped to be situated within a housing. The battery has a shape that substantially conforms to a shape of a cavity that is defined at least in part by a non-cylindrical curved portion of the housing. The battery includes a contoured conductive mesh formed by shaping a substantially planar conductive mesh to include at least one curved conductive mesh portion. Other embodiments are described and claimed.

18 Claims, 12 Drawing Sheets

CONTOURED BATTERY

TECHNICAL FIELD

Embodiments described herein generally relate to contoured batteries.

BACKGROUND

Electronic devices are often powered by a battery source. Batteries are typically fabricated in rectangular shapes and cylindrical shapes (e.g., AAA, AA, C, D batteries). Some batteries ("coin cells") are also manufactured in a generally circular disk shape. Coin cells typically are fabricated with a single anode/separator/cathode "sandwich" constructed from thick layers of active materials. Coin cells constructed in a sandwich configuration typically have high energy density and are engineered to provide a small current for long periods of time (e.g., years).

Power characteristics of coin cells are suitable for use in calculators and watches, but coin cells are typically challenged to provide current pulses that may be needed for short high-current wakeup periods, which are a hallmark of some power management schemes. For example, active vehicle identification tags remain idle at very low power and may require additional power to "waken" to full functionality when they are called on to verify an identity.

One solution to providing power to such systems is to use a lithium-ion cell, which typically has a high proportion of cell packaging, which may limit an amount active charge-carrying material as the traditional lithium-ion cell gets smaller. Another solution to providing power to systems needing power bursts is to use multiple coin cells in a system. However, space constraints may weigh against use of multiple coin cells to be housed within a housing of an electronic device.

DETAILED DESCRIPTION

In various embodiments, a battery having both longevity of energy output and capability to provide power bursts can be formed into different shapes, e.g., non-rectangular, annular, having one or more curved surfaces, and other three-dimensional shapes that may be advantageous to conform to space constraints, e.g., within a housing of an electronic device. In alternative cell constructions, for example, a current collector can be made from a three-dimensional (3-D) conducting foam matrix (e.g., copper mesh) coated, or filled with, an active anode material, e.g., lithium cobalt oxide ($LiCoO_2$). In such a construction a path taken by electrons leads to inside walls of the conducting mesh.

In embodiments presented herein, non-planar cells may be fabricated using a conducting mesh that is initially substantially planar. Such a mesh may be an anode structure of mesh filled with anode active material, a cathode mesh filled with cathode active, or a complete battery structure deposited as a set of battery layers built up within the structure of the initial conducting (e.g., metallic) foam core.

A battery cell may be constructed completely inside a foam core, which is acting as a first electrode current collector, and a second ("counter") electrode current collector may be deposited on an outside surface of the battery cell. A travel path for ions may be from active material inside the porous foam mesh to another part of the foam mesh. The travel path for electrons may be longer than the travel path of the ions, e.g., traversing to an outside surface of the battery cell, where the current collector (counter electrode current collector) is located.

In embodiments described herein, batteries may be constructed that have various three-dimensional (3-D) shapes. For example, the conducting mesh material may be shaped into a pre-formed shape by cutting (including cutting one or more holes in the conducting mesh material) and/or by deforming (e.g., crushing) the conducting mesh into a mold, resulting in a contoured conducting mesh. A shape of the mold may be determined based upon a space into which the battery will be installed. For example, the mold may be selected so as to produce a battery whose three-dimensional extent conforms to a hollow portion of a housing of an electronic device, enabling the housing to accommodate both the device and the battery.

Figure 1:
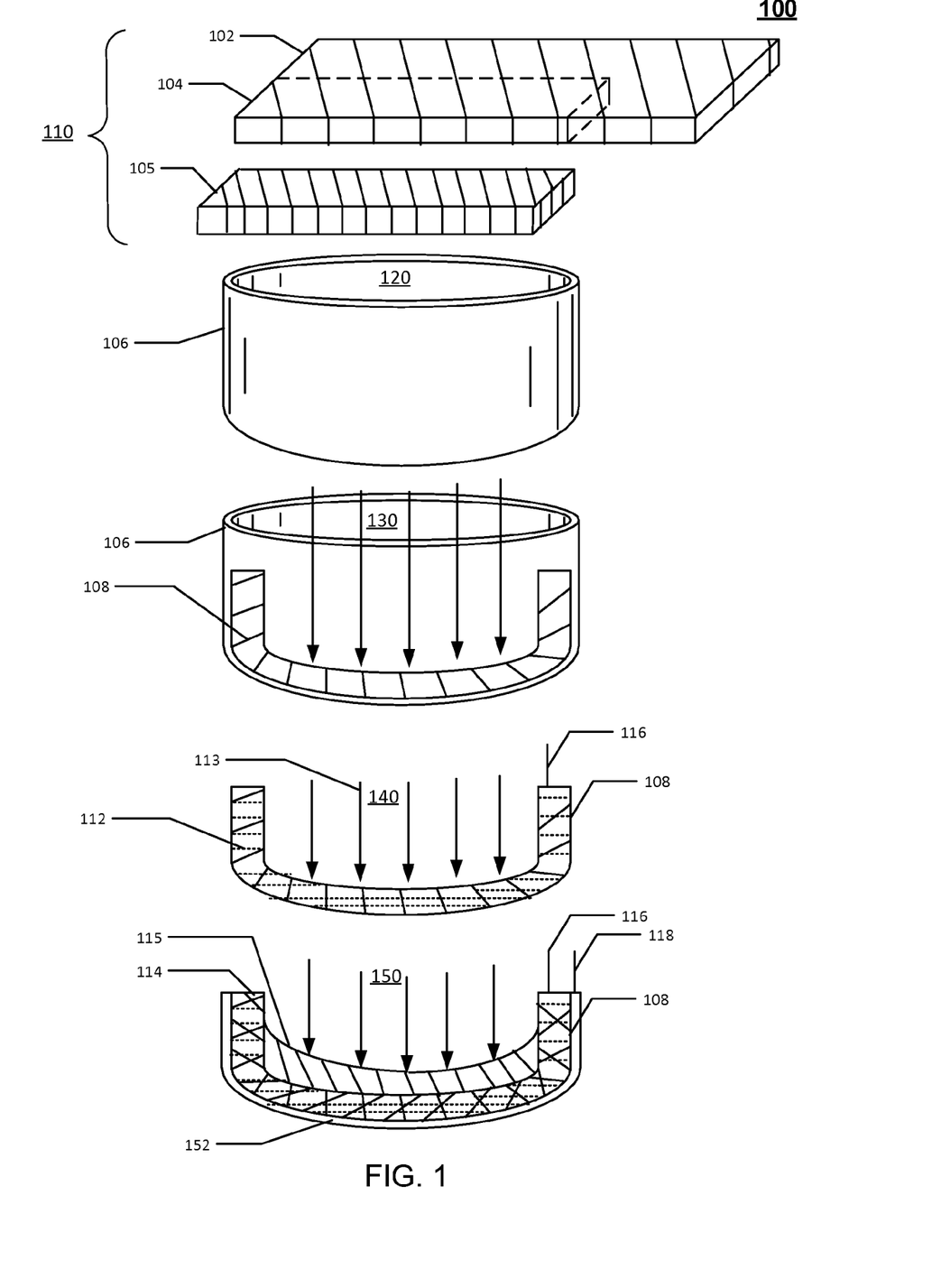
FIG. 1 is a block diagram of a process to fabricate a battery, according to an embodiment of the present invention.

FIG. 1 is a block diagram of a process 100 to form a battery, according to an embodiment of the present invention. At a first stage 110, a planar mesh conductor (e.g., copper mesh, metallic foam, or other porous conductor) may be sized to a size 104, e.g., cut from a larger sheet 102 of planar mesh conductor, and shaped to form a sized/shaped mesh conductor 105. The size/shape of the sized/shaped mesh conductor 105 may be determined based on a size and shape of the battery to be fabricated, which may in turn be based on a shape of a device housing within which the battery is to reside and may depend upon a contour of an empty region that will receive the battery after fabrication is complete. In some embodiments, sizing and shaping may include creating one or more holes in the mesh conductor. For example, a hole in the mesh conductor may allow for the battery, upon assembly, to be placed on a protuberance within the housing, or may allow the battery to surround, within the housing, the device to be powered.

In some embodiments, sizing and shaping may include introducing non-uniformities in thickness of the sized mesh conductor 105. For example, the thickness may be shaped to form a wedge shape that has a greater thickness on one edge of the sized/shaped mesh conductor 105 than another edge of the sized/shaped mesh conductor 105. In another example, one or more indentations may be introduced into the sized/shaped mesh conductor 105 through plastic deformation of the planar mesh conductor. In still other embodiments, the mesh conductor may be shaped to include a plurality of indentations. Such indentations may result in having localized regions of a shorter electronic path through the mesh conductor, as compared with other regions. Short electronic travel pathways within the battery can enhance the battery's ability to provide one or more power bursts when needed.

At a second stage 120 of the process 100, a mold 106 may be formed whose shape/dimensions are based on a shape of the device housing in which the battery is to reside. The mold may be created by, e.g., computer aided machine techniques, use of a 3-D printer, or via another technique.

At a third stage 130, the sized/shaped mesh conductor 105 may be deformed by plastic deformation (e.g., crushed) to substantially conform to an interior surface of the mold 108, to form a contoured mesh conductor 108 having a shape that substantially conforms to the shape of the interior surface of the mold 106. Upon plastic deformation, the contoured mesh conductor 108 does not revert to its prior shape when removed from the mold 106, but instead assumes the shape of the mold 106.

At a fourth stage 140, the contoured mesh conductor 108 may be removed from the mold 106. An anode conducting lead 116 may be attached to the contoured mesh conductor 108 (e.g., at the fourth stage, or at a later stage). Anode material 112 may be deposited onto the contoured mesh conductor 108. Subsequently, electrolyte material 113 may be deposited over the anode material 112. (In some embodiments, the anode material 112 and electrolyte material 113 may be deposited onto the contoured mesh conductor 108 while in the mold 106.)

At stage 150, the contoured mesh conductor 108 may be inserted into a conducting outer shell 152, and cathode material 114 may be deposited in the contoured mesh conductor 108 coated with anode material 112 and electrolyte material 113. The cathode material 114 may also contact the outer shell 152. Cathode conducting lead 118 may be attached to the outer shell 152. In some embodiments, contents of the cell (e.g., anode, electrolyte, cathode) may be liquid that is cured so as to create a solid (e.g., non-liquid) cell.

In other embodiments, assembly of the battery may differ from that of FIG. 1. For example, in other embodiments, planar conducting mesh material may be cut and shaped to size, deformed (e.g., crushed) into a 3-D mold, and formed into a 3-D cell using other techniques to incorporate the anode, electrolyte and cathode materials into the cell. Further, assembly of the battery may be conducted in a different order than shown in process 100. In some embodiments, the conducting mesh material may be deformed to conform to an exterior surface of a mold, subsequently removing the deformed conducting mesh material from the mold. Still other shapes of the conducting mesh material are contemplated, including deforming by introducing one or more angular bends (e.g., creases) into the conducting mesh, formation of the conducting mesh into an annular shape prior to, or instead of deforming to conform to a mold, formation of other shapes such as various non-rectangular shapes, etc. Further, in some embodiments, an order of deposition of the anode, cathode, and electrolyte may be changed. For example, the cathode material may be deposited prior to the electrolyte and the anode material.

Figure 2:
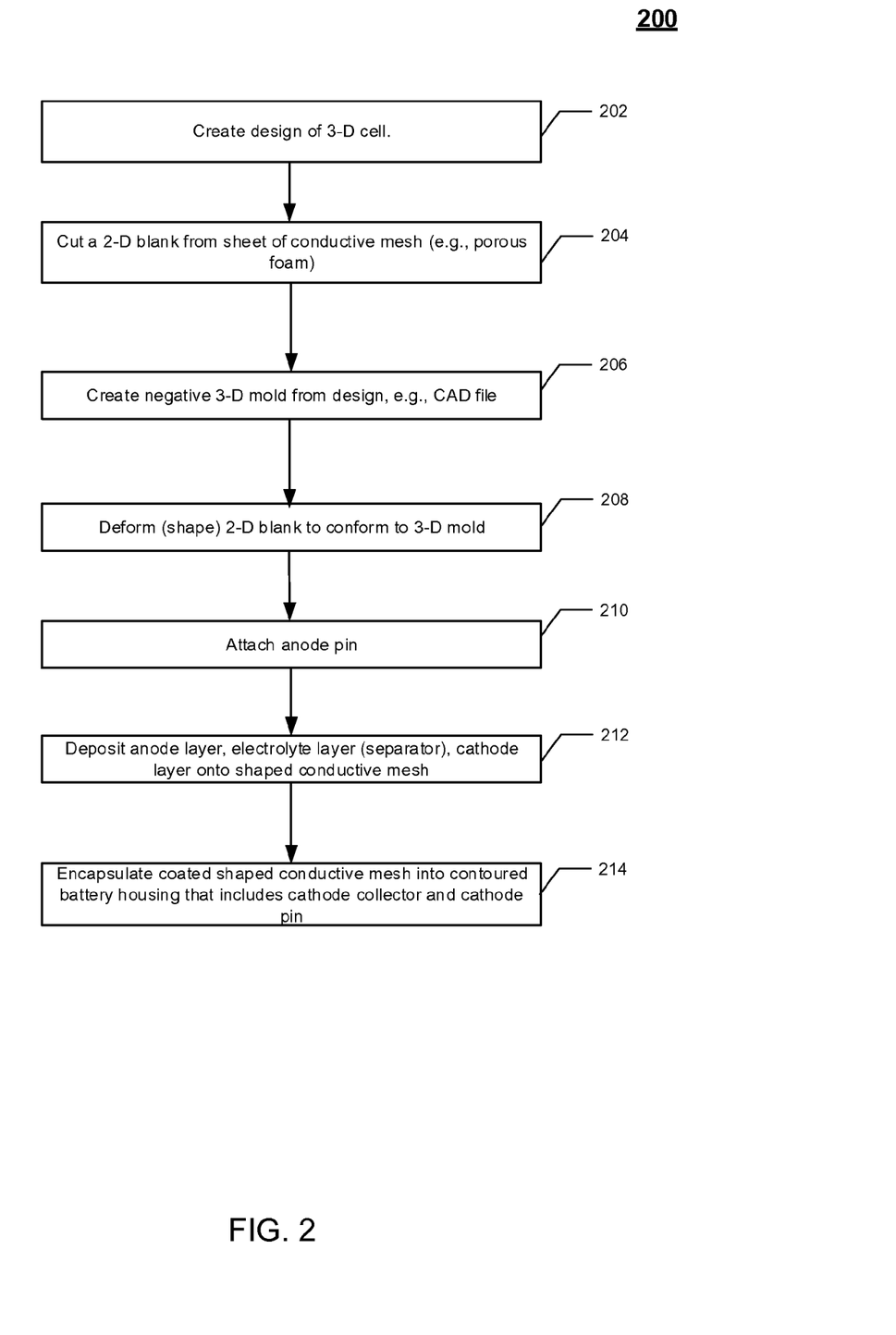
FIG. 2 is a flow diagram of a method of fabricating a battery, according to an embodiment of the present invention.

FIG. 2 is a flow diagram of a method 200 of forming a battery, according to an embodiment of the present invention. At block 202, a design may be created and used to create a three-dimensional (3-D) mold (e.g., via a computer aided design (CAD) file). Continuing to block 204, a sized blank is cut and shaped from a sheet of conducting mesh material, e.g., planar conducting mesh. For example, the conducting mesh material may be a copper mesh, or other metal mesh, or another conductive porous material that can serve as a scaffolding material for battery cell formation. In some embodiments, the sheet of conducting mesh material is flexible with an elastic limit, e.g., when deformed beyond the elastic limit (e.g., plastic deformation), the conducting mesh may assume a second shape that differs from an initial shape and does not automatically return to the initial shape upon release of deformation forces. Instead, upon plastic deformation the conducting mesh is reshaped substantially to a contour of the mold. In some embodiments, one or more holes may be introduced into the conducting mesh, e.g., while in its planar shape. In some embodiments, non-uniformity in thickness of the metal mesh may be introduced, e.g., through elastic deformation, shaping portions of the planar material to produce a sloped cross section (wedge-shape), or other cross-section thickness non-uniformity.

Advancing to block 206, a 3-D mold (e.g., a negative 3-D mold) may be created based on the design (e.g., as represented in one or more CAD files). Moving to block 208, the sized/shaped planar blank may be plastically deformed (e.g., crushed) into the 3-D mold, changing shape of the blank to a 3-D (contoured) shape. Advancing to block 210, optionally an anode pin (external contact) may be attached to the contoured conducting mesh. (In other embodiments, the anode pin may be attached after an anode layer is deposited.) Proceeding to block 212, the anode layer, an electrolyte layer that may also serve as a separator between anode and cathode, and a cathode layer are each deposited onto the deformed conducting mesh. Deposition of the anode, electrolyte (separator), and cathode layers may occur while the deformed conducting mesh is in the 3-D mold, or after removal from the 3-D mold. The anode, electrolyte, and cathode layers may be deposited by various techniques, e.g., electrochemical deposition, application of a slurry (after application, the slurry may be cured to form a solid), or by other application techniques. Continuing to block 214, after the anode, electrode and cathode layers are deposited the coated contoured conducting mesh may be encapsulated into a battery housing that includes a cathode collector and a cathode pin to complete fabrication of the battery.

Manufacture of a battery (or individual cells of a multi-cell battery) in this manner may be relatively inexpensive in setup cost and can make use of substantially planar conducting sheets that may be readily available. Manufacture of batteries according to the embodiments presented herein enables creation of cells and batteries of various 3-D shapes. Therefore, the batteries can be manufactured for installation into non-rectangular housings. Power characteristics of cells manufactured according to the embodiments presented herein may include both battery longevity and ability to provide a power burst on an as needed basis.

Figure 3:
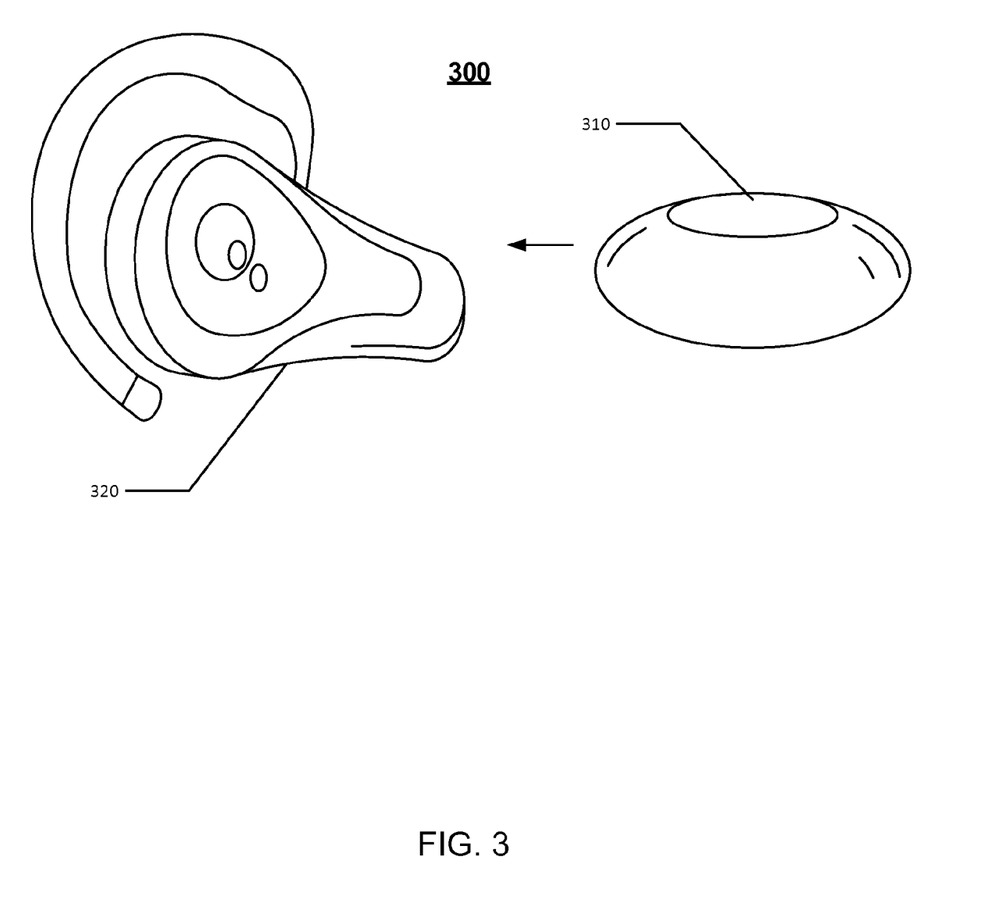
FIG. 3 is a diagram of system according to an embodiment of the present invention.

FIG. 3 is a diagram of system 300 according to an embodiment of the present invention. The system includes a battery 310 and an earpiece 320 such as an audio transducer (e.g., headphone). The battery 310 is shaped to be inserted into the earpiece 320.

The battery 310 may be formed according to the techniques described herein. For example, the battery 310 may be formed by constructing a 3-D mold having a shape similar to the completed battery 310; cutting/shaping a planar conducting mesh sheet to a determined size (sized planar conducting mesh) including a hole to form an annular shape, deforming (e.g., crushing) the sized planar conducting mesh into the mold to form a contoured 3-D conducting mesh ("scaffold"); depositing layers (anode material, electrolyte material, and cathode material) onto the 3-D contoured scaffold; and enclosing the 3-D contoured scaffold into a battery housing. The battery 310 may be advantageously shaped to conform to a shape of the earpiece 320, so as to be inserted into the earpiece 320.

Figure 4:
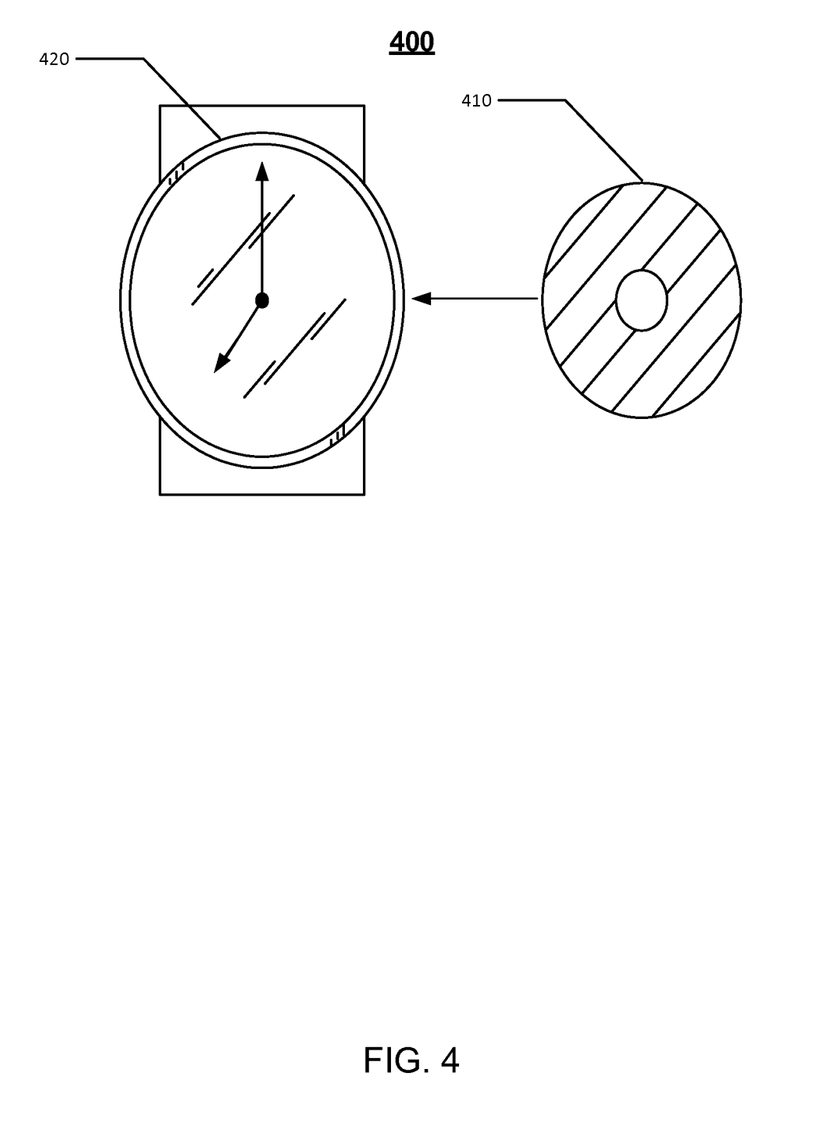
FIG. 4 is a diagram of system according to another embodiment of the present invention.

FIG. 4 is a diagram of system 400 according to another embodiment of the present invention. The system includes a battery 410 and a watch 420. The battery 410 is shaped to be inserted into the watch 420 (e.g., toroidal (annular shaped)).

The battery 410 may be formed according to the techniques described herein. For example, the battery 410 may be formed by constructing a 3-D mold having an annular shape similar to the completed battery 410; cutting/shaping a planar conducting mesh sheet to an annular footprint, deforming (e.g., crushing) the sized planar mesh sheet into the mold to form a contoured 3-D conducting mesh; depositing layers (anode material, electrolyte material, and cathode material) onto the 3-D mesh; and enclosing the 3-D mesh into a battery housing that includes an anode terminal and a cathode terminal. The battery 410 is advantageously shaped to be inserted into the watch 420.

Figure 5:
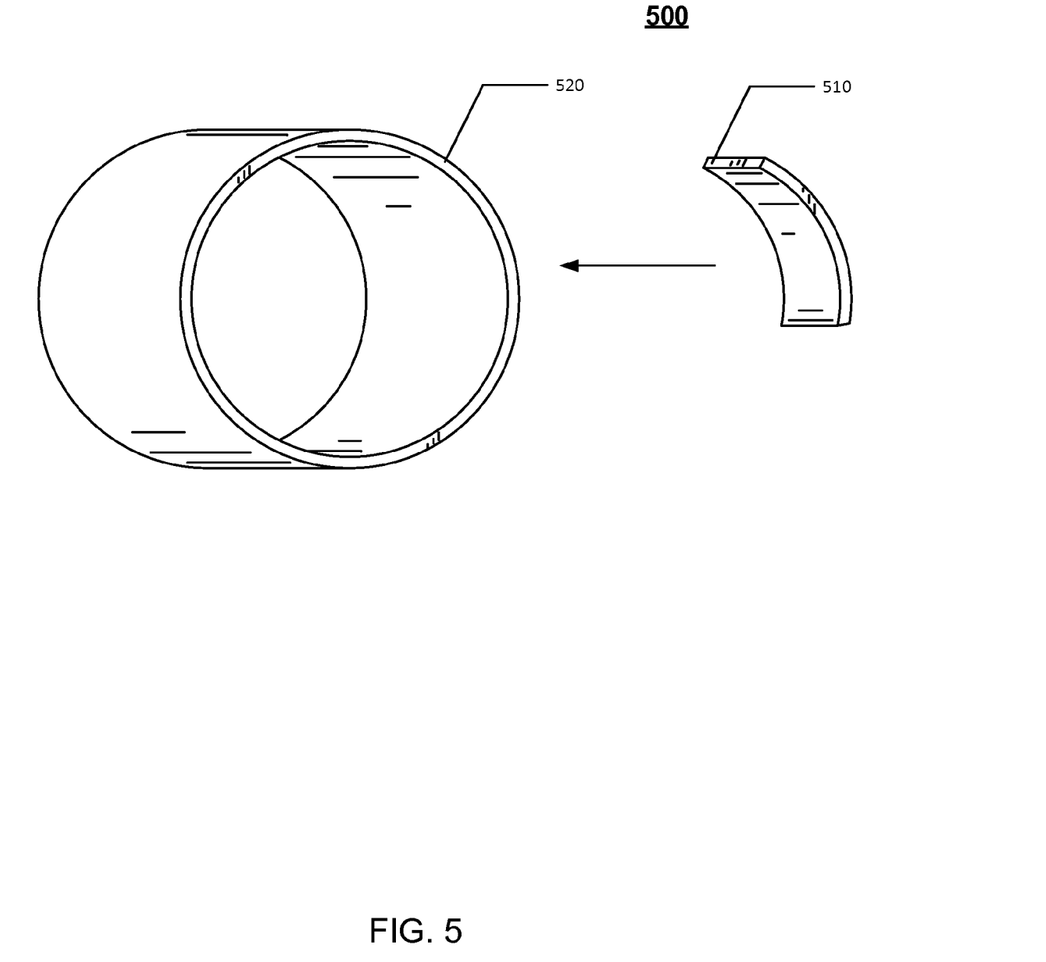
FIG. 5 is a diagram of system according to another embodiment of the present invention.

FIG. 5 is a diagram of system 500 according to another embodiment of the present invention. The system includes a battery 510 and wearable device such as a bracelet 520. The battery 510 is shaped to be inserted into the bracelet 520 (e.g., curved contour).

The battery 510 may be formed according to the techniques described herein. For example, the battery 510 may be formed by constructing a 3-D mold having a curved shape similar to the completed battery 510; cutting a planar conducting mesh sheet to a determined size (sized planar conducting mesh), deforming (e.g., crushing or bending) the sized planar mesh sheet into the mold to form a contoured 3-D conducting scaffold; depositing layers (anode material, electrolyte material, and cathode material) onto the shaped 3-D scaffold; and enclosing the 3-D conducting scaffold into a battery housing that includes an anode terminal and a cathode terminal. The battery 510 is advantageously shaped to be inserted into the bracelet 520.

Figure 6:
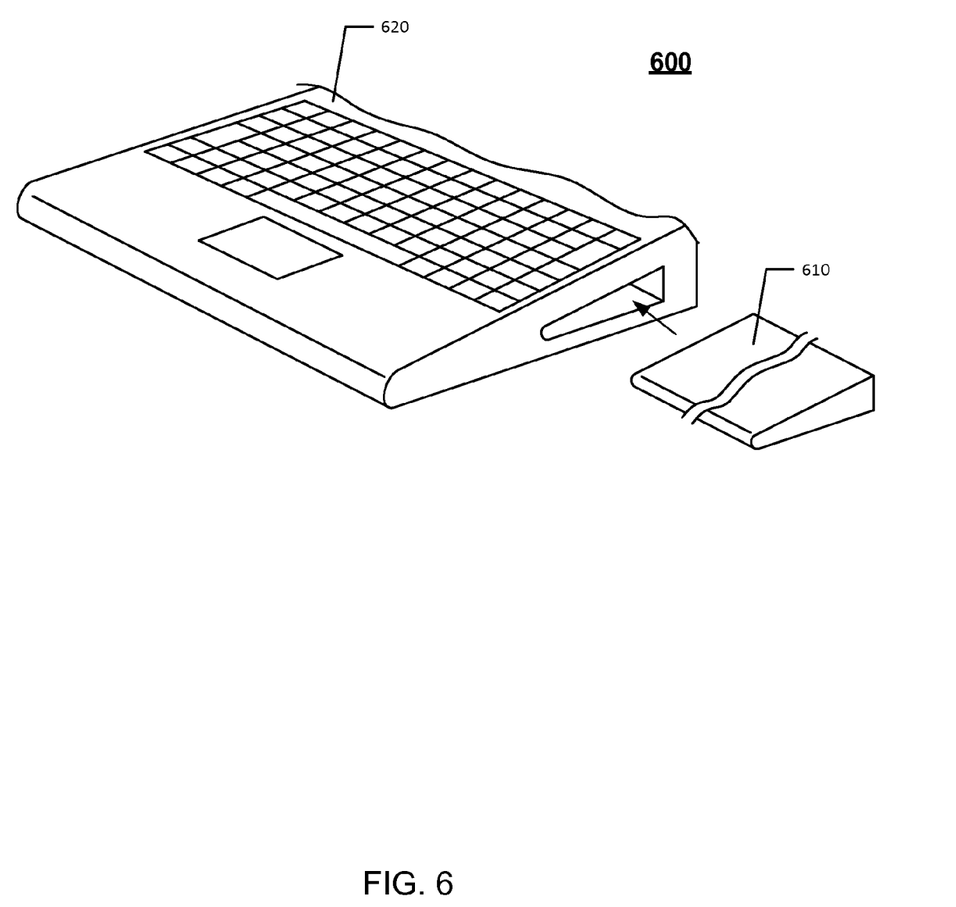
FIG. 6 is a diagram of system according to another embodiment of the present invention.

FIG. 6 is a diagram of system 600 according to another embodiment of the present invention. The system includes a battery 610 and computational device 620 (e.g., an Ultrabook™). The battery 610 is shaped to be inserted into the computational device 620 (e.g., wedge-shaped contour).

The battery 610 may be formed according to the techniques described herein. For example, the battery 610 may be formed by constructing a 3-D mold having a curved shape similar to the completed battery 610; cutting a planar conducting mesh sheet to a determined size (sized planar conducting mesh) and introducing a non-uniform thickness (wedge shape), deforming (e.g., crushing) the sized planar conducting mesh sheet into the mold to form a contoured 3-D scaffold; depositing layers (anode material, electrolyte material, and cathode material) onto the contoured 3-D scaffold; and enclosing the contoured 3-D scaffold into a battery housing that includes an anode terminal and a cathode terminal. The battery 610 is advantageously shaped to conform to a shape of the computational device 620 and to be inserted into the computational device 620.

Figure 7:
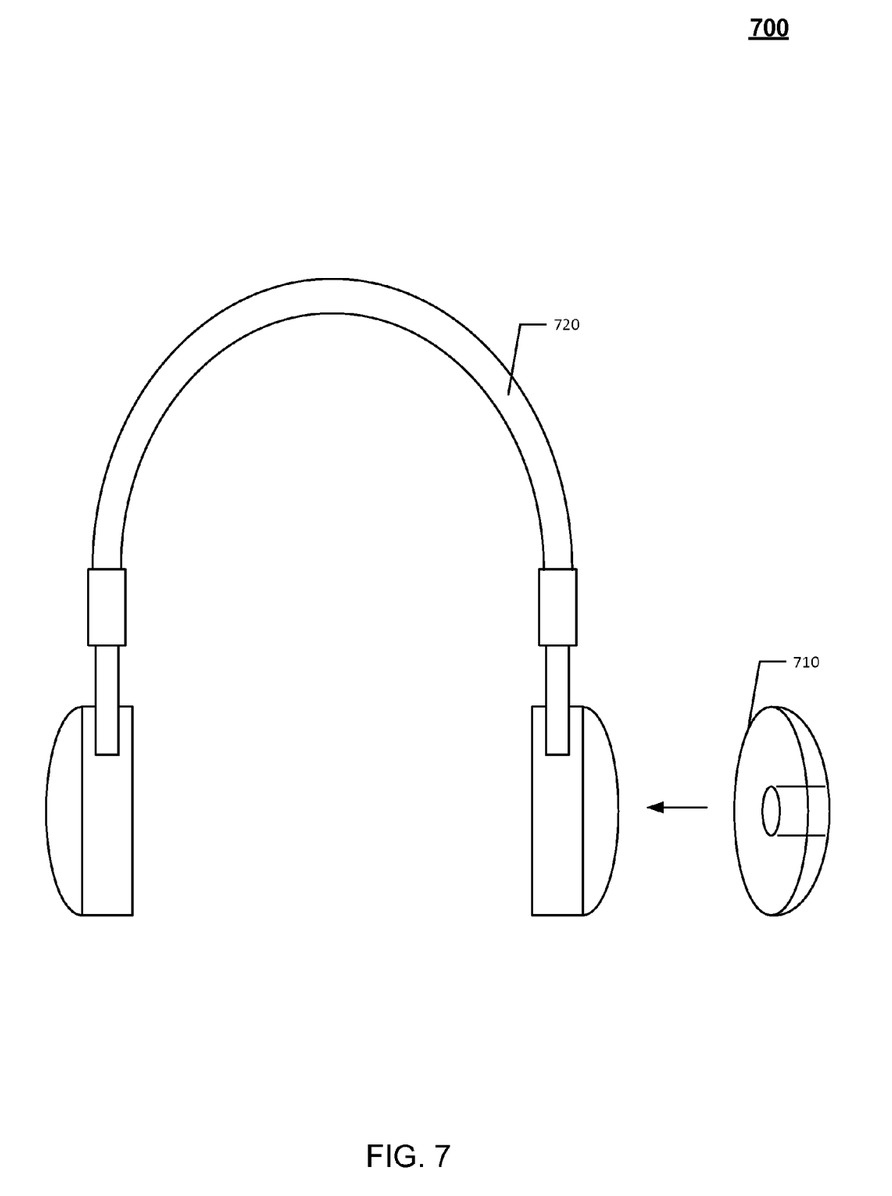
FIG. 7 is a diagram of system according to another embodiment of the present invention.

FIG. 7 is a diagram of system 700 according to another embodiment of the present invention. The system includes a battery 710 and headphones 720. The battery 710 is shaped (e.g., annular with an edge contour to be inserted into each earphone) to be inserted into the headphones 720.

The battery 710 may be formed according to the techniques described herein. For example, the battery 710 may be formed by constructing a 3-D mold having a curved shape similar to the completed battery 710 (e.g., conforming to a space within the headphones); cutting a planar conducting mesh sheet to a determined size including a hole (sized planar conducting mesh), deforming (e.g., crushing) the sized planar mesh sheet into the mold to form a contoured 3-D scaffold; depositing layers (anode material, electrolyte material, and cathode material) onto the contoured 3-D scaffold; and enclosing a coated contoured 3-D scaffold into a battery housing that includes anode and cathode terminals. The battery 710 is advantageously shaped to be inserted into the headphones 720, e.g., to conform to a shape of a portion (e.g., earpiece) of the headphones 720.

Figure 8:
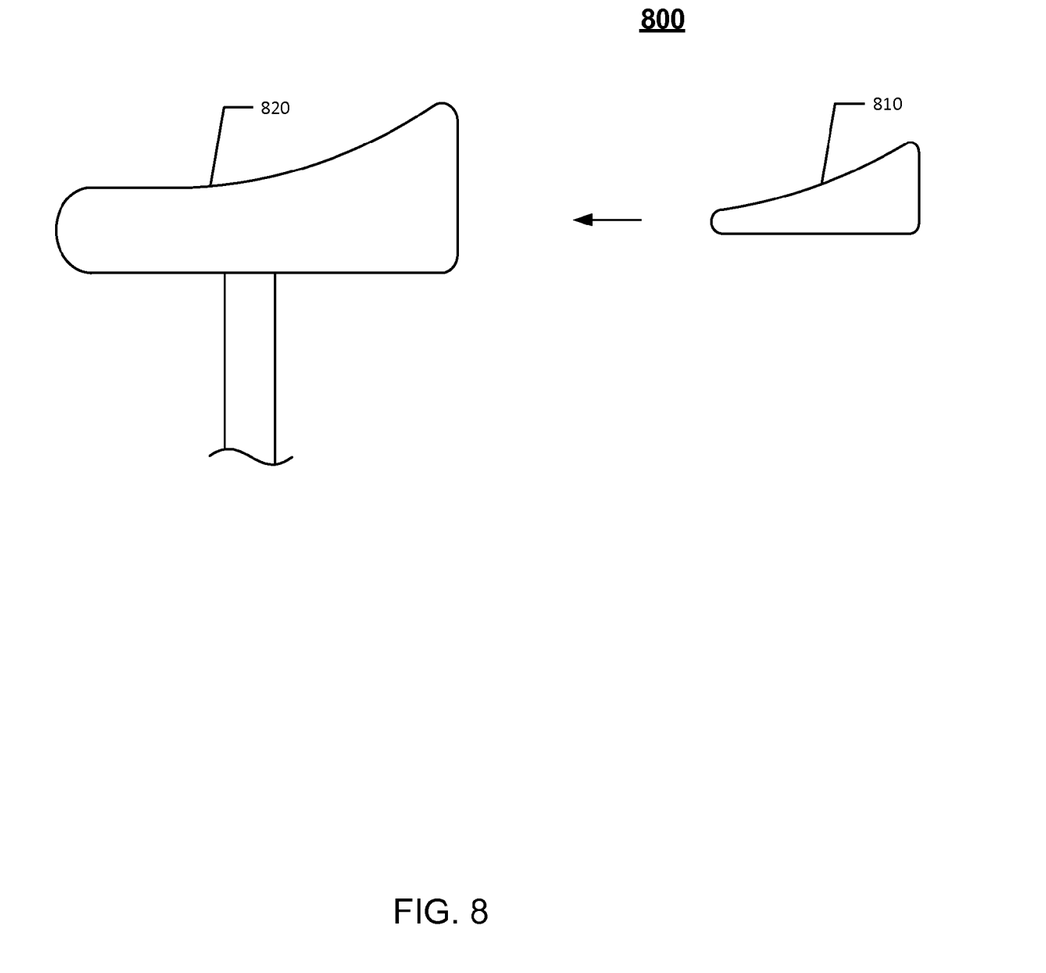
FIG. 8 is a diagram of system according to another embodiment of the present invention.

FIG. 8 is a diagram of system 800 according to another embodiment of the present invention. The system includes a battery 810 and a bicycle seat 820. The battery 810 is shaped to be inserted into the bicycle seat 820.

The battery 810 may be formed according to the techniques described herein. The battery 810 is advantageously shaped to be inserted into the battery seat 820. The battery formed as described in embodiments of the present invention may be able to provide power to a device attached or otherwise coupled to the bicycle seat. Shaping of a conducting mesh may include introduction of a thickness gradient in the conducting mesh to form a wedge shape.

Figure 9:
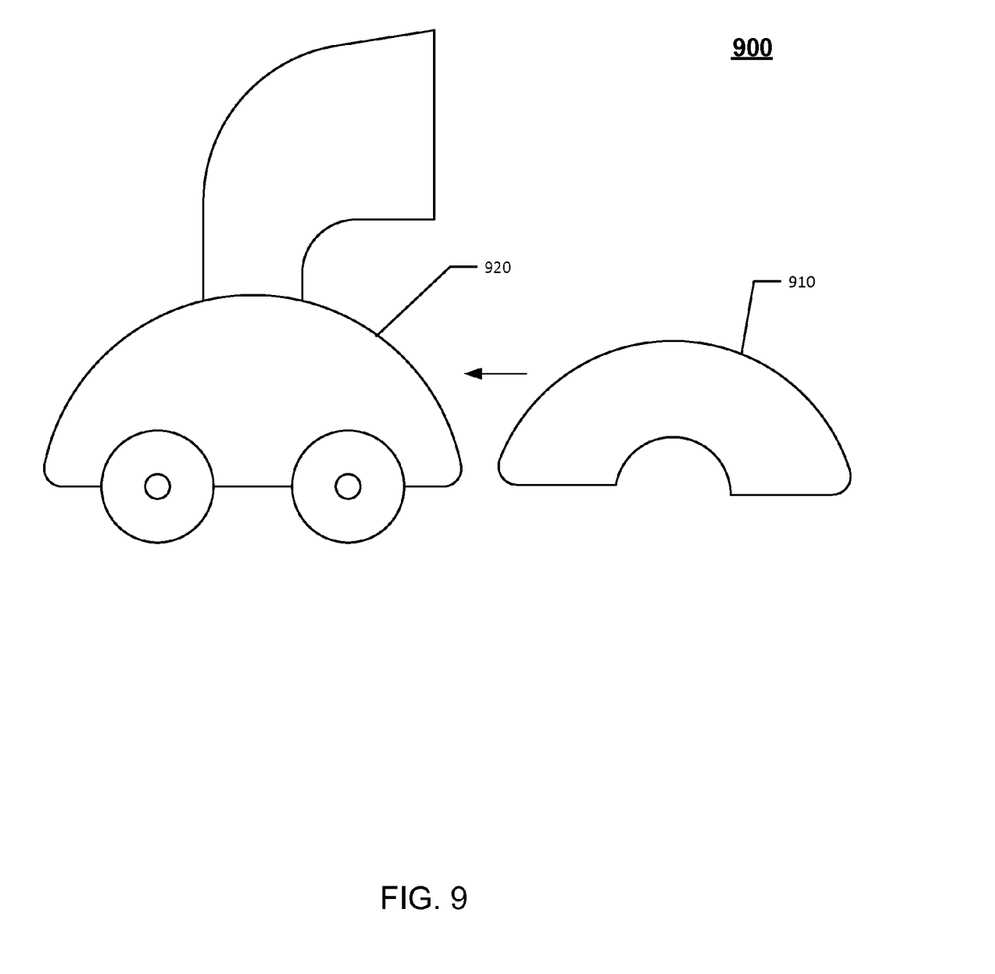
FIG. 9 is a diagram of system according to another embodiment of the present invention.

FIG. 9 is a diagram of system 900 according to another embodiment of the present invention. The system includes a battery 910 and a pool sweep device 920. The battery 910 is shaped to be inserted into the pool sweep device 920. The battery 910 may be formed according to the techniques described herein. The battery 910 is advantageously shaped to be inserted into the pool sweep device 920.

Figure 10:
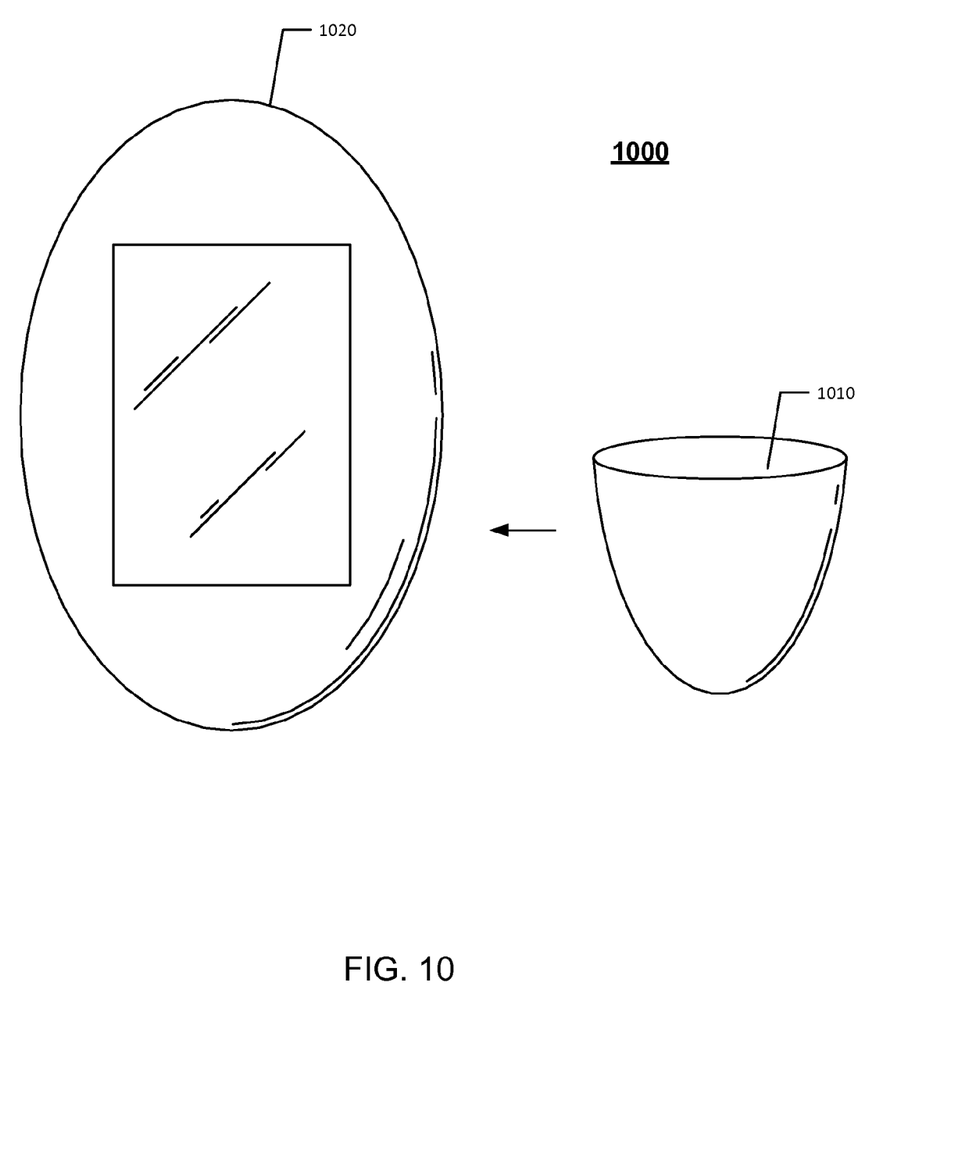
FIG. 10 is a diagram of system according to another embodiment of the present invention.

FIG. 10 is a diagram of system 1000 according to another embodiment of the present invention. The system includes a battery 1010 and a cell phone device 1020. According to embodiments of the present invention, the battery 1010 is shaped to be inserted into the cell phone device 1020. The battery 1010 may be constructed as described in embodiments presented herein. The battery may include one or more curved surfaces.

Figure 11:
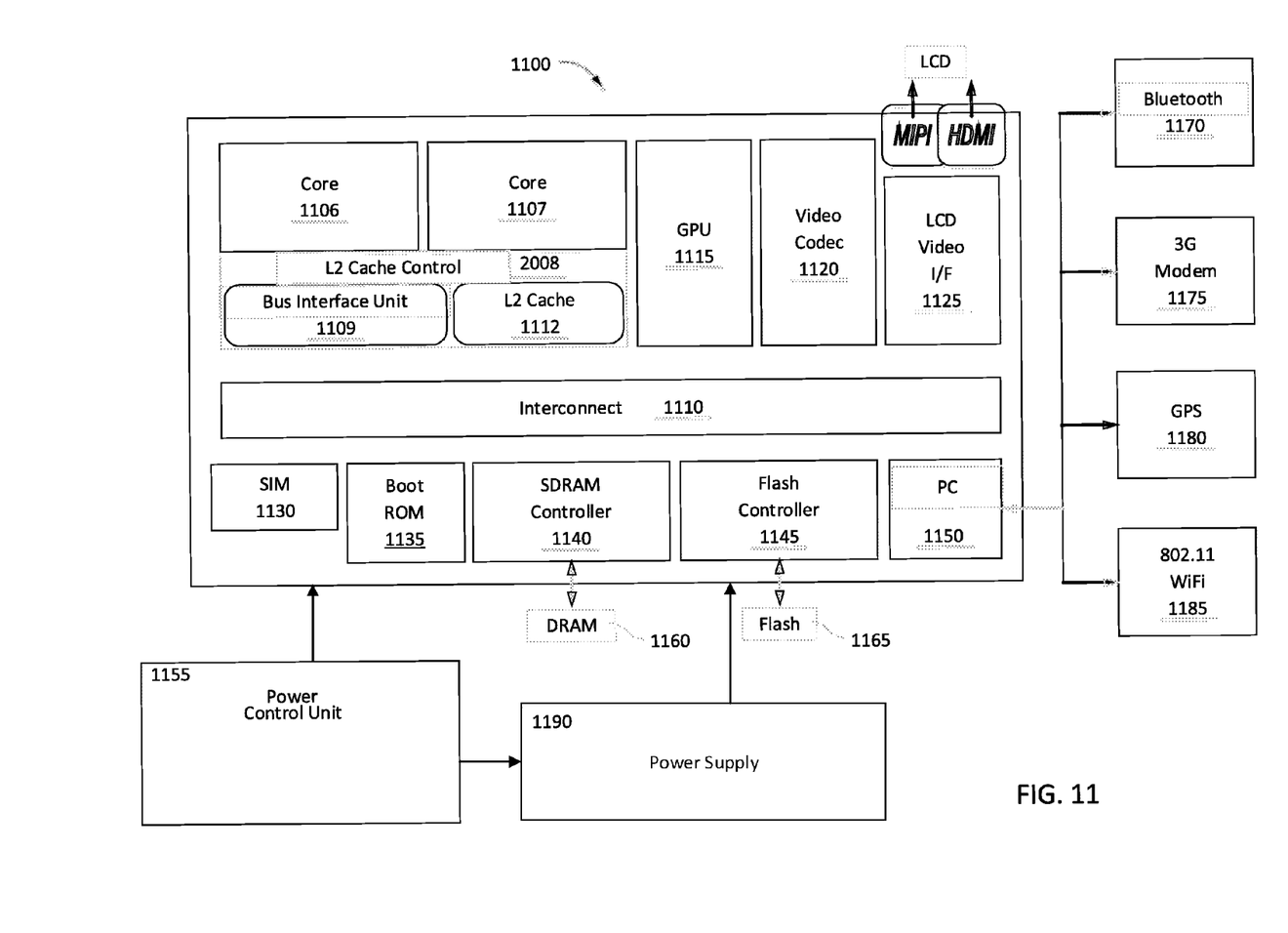
FIG. 11 is a block diagram of a system on a chip (SoC) design in accordance with an embodiment of the present invention.

FIG. 11 is a block diagram of a system on a chip (SoC) design in accordance with an embodiment of the present invention. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 1100 includes two cores, 1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1112 to communicate with other parts of system 1100.

Interconnect 1110 provides communication channels to other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral controller 1150 (e.g. Serial Peripheral Interface) to interface with peripherals, video codecs 1120 and video interface 1125 to display and receive input (e.g. touch enabled input), graphics processing unit (GPU) 1115 to perform graphics related computations, etc. Power control unit (PCU) 1155 determines power to be provided by a power supply 1190 to each of the modules of the SOC 1100 including power to cores 1106, 11007, and GPU 1115. The power supply 1190 may include a battery that is fabricated according to embodiments of the present invention. In some embodiments, the battery may be shaped in an L shape, which may be constructed by sizing/shaping substantially planar conductive mesh to include the L-shape, e.g., through introduction of a crease in the planar conductive mesh, and coating the shaped conductive mesh with anode, electrolyte, and cathode material, as described in embodiments herein. A small shaped battery may also be assembled as part of the SOC 1100.

In addition, the system 1100 illustrates peripherals for communication, such as a Bluetooth module 1170, 3G modem 1175, GPS 1180, and WiFi 1185. Note as stated above, a UE includes a radio for communication. As a result, these peripheral communication modules are not all required. However, in a UE some form of radio for external communication may be included.

Figure 12:
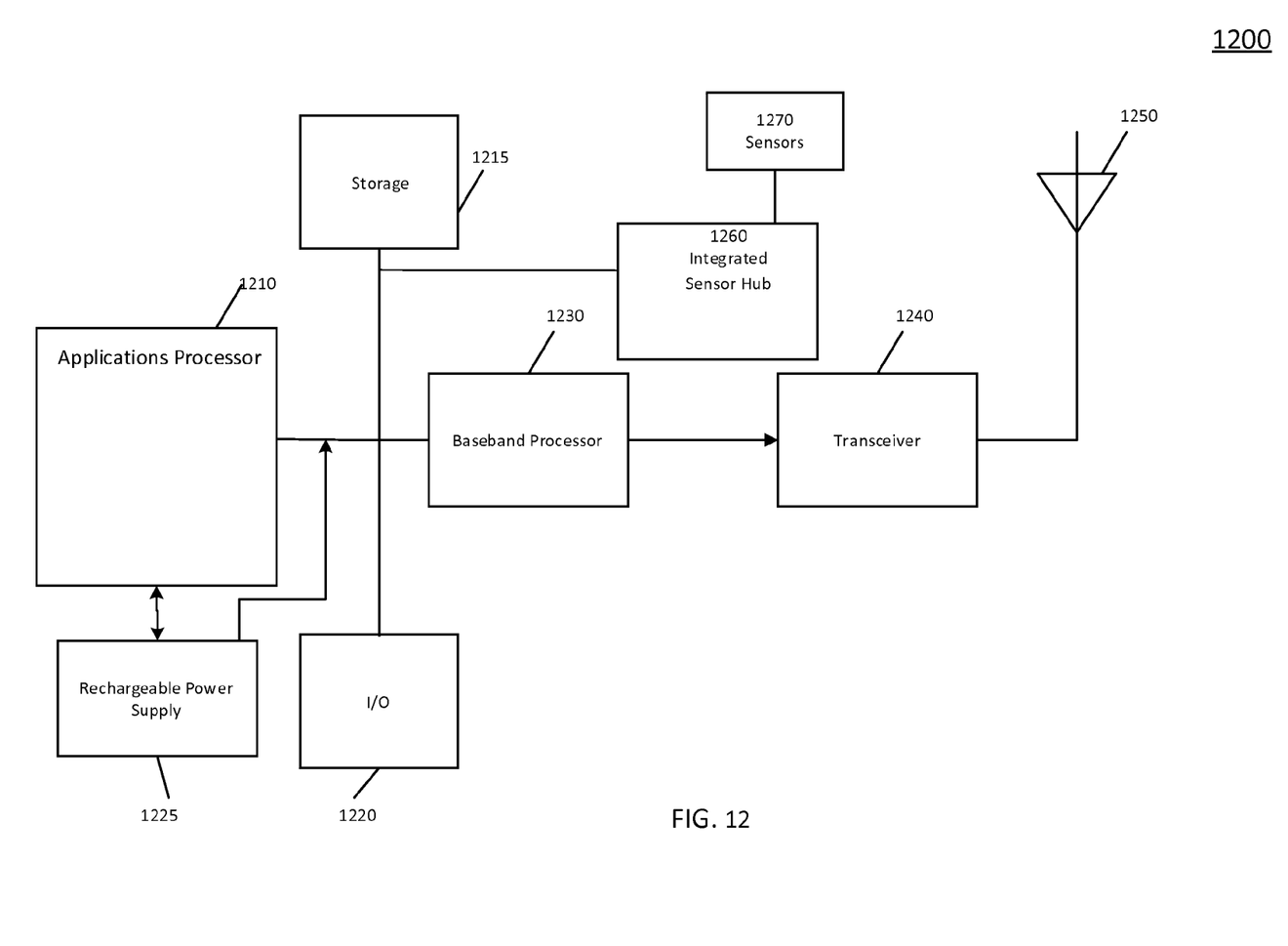
FIG. 12 is a block diagram of a mobile device system in accordance with an embodiment of the present invention.

Embodiments can be incorporated into other types of systems including mobile devices such as a cellular telephone. Referring now to FIG. 12, shown is a block diagram of a mobile device system in accordance with an embodiment of the present invention. As shown in FIG.12, system 1200 may include various components. As shown in the high level view of FIG.12, an applications processor 1210, which may be a central processing unit of the device, is in communication with various components, including a storage 1215. Storage 1215, in various embodiments, may include both program and data storage portions.

Applications processor 1210 may further be coupled to an input/output system 1220, which in various embodiments may include a display and one or more input devices such as a touch keypad, which itself can appear on the display when processed. The system 1200 may also include an integrated sensor hub (ISH) 1260 that may receive data from one or more sensors 1270. The applications processor 1210 may include one or more cores and may optionally include a graphics processing unit (not shown).

Applications processor 1210 also may couple to baseband processor 1230, which may condition signals such as voice and data communications for output, as well as conditioning incoming telephone and other signals. As seen, baseband processor 1230 couples to transceiver 1240, which may enable both receive and transmit capabilities. In turn, transceiver 1240 may be in communication with an antenna 1250, e.g., any type of antenna capable of transmitting and receiving voice and data signals via one or more communication protocols such as via a wireless wide area network (e.g., a 3G or 4G network) and/or a wireless local area network, such as a BLUETOOTH™ or so-called WI-FI™ network in accordance with an Institute of Electrical and Electronics Engineers 802.11 standard.

As seen, system 1200 may further include a rechargeable power supply 1225 including a rechargeable battery to enable operation in a mobile environment. The battery may be fabricated according to embodiments of the present invention. For example, the battery may be fabricated, according to embodiments presented herein, to fit in a 3-D housing that houses the cellar phone device 1200. The fabrication may include shaping (e.g., by deformation) a conducting porous matrix (e.g., mesh) to a shape defined by a 3-D mold (e.g., having one or more curved contours), as in embodiments of the present invention. The shaped coated conducting mesh may be placed in a battery housing whose shape conforms to a space within a cell phone housing, enabling insertion of the battery within the cell phone housing.

While shown with this particular implementation in the embodiment of FIG. 12, the scope of the present invention is not limited in this regard.

Additional embodiments are described below.

A first example is an apparatus that includes a battery shaped to be situated within a housing. The battery has a shape that substantially conforms to a shape of a cavity that is defined at least in part by a non-cylindrical curved portion of the housing. The battery includes a contoured conductive mesh formed by shaping a substantially planar conductive mesh to include at least one curved conductive mesh portion.

A second example includes elements of the first example, where the contoured conductive mesh includes one of an anode material and a cathode material.

A third example includes elements of the first example, where the contoured conductive mesh is shaped by plastic deformation of the planar conductive mesh.

A fourth example includes the elements of any one of claims 1 to 3, where the contoured conductive mesh includes an annular portion.

A fifth example includes the elements of any one of claims 1 to 3, where formation of the contoured conducted mesh includes introduction of non-uniformity of cross-section thickness into the substantially planar conductive mesh.

A sixth example is a method including shaping a conductive mesh by plastic deformation of the conductive mesh from a first shape that is substantially planar to a second shape that includes a curved portion, where upon the plastic deformation from the first shape to the second shape the shaped conductive mesh remains in the second shape. The method also includes after shaping the conductive mesh, forming a battery from the shaped conductive mesh.

A seventh example includes the elements of the sixth example, where forming the shaped battery includes affixing anode material, electrolyte, and cathode material to the shaped conductive mesh and enclosing in a battery housing the shaped conductive mesh with the anode material, the electrolyte, and the cathode material affixed.

An eighth example includes the elements of the sixth example, where shaping the conductive mesh includes deforming the conductive mesh to conform to a surface of a three-dimensional mold having a selected shape that includes a non-cylindrical curved portion.

A ninth example includes the elements of the eighth example, where the surface is convex.

A tenth example includes the elements of the eight example, where the surface is concave.

An $11^{th}$ example includes the elements of the sixth example, where the second shape is selected to conform to an enclosure within which the battery is to be installed.

A 12$^{th}$ example includes the elements of the 11$^{th}$ example, where shaping the conductive mesh further comprises forming a hole in the substantially planar conductive mesh.

A 13$^{th}$ example includes the elements of the 12$^{th}$ example, where the hole is placed to accommodate a protuberance in the enclosure.

A 14$^{th}$ example includes the elements of the 6$^{th}$ example, where shaping the conductive mesh includes forming a tapered thickness of the conductive mesh, where a first thickness of the conductive mesh at a first edge of the conductive mesh differs from a second thickness of the conductive mesh at a second edge of the conductive mesh.

A 15$^{th}$ example includes the elements of the 6$^{th}$ example, where the second shape includes a toroidal portion.

A 16$^{th}$ example includes the elements of the 6$^{th}$ example, where shaping comprises introducing a non-uniformity into a thickness dimension of a portion of the conductive mesh.

A 17$^{th}$ example is an apparatus including means to perform the method of any one of the 6$^{th}$ to the 16$^{th}$ examples.

An 18$^{th}$ example is an apparatus to perform the method of any one of the 6$^{th}$ to the 16$^{th}$ examples.

A 19$^{th}$ example is a method including plastically deforming a conducting porous structure from a substantially planar shape to a shaped conducting porous structure having a non-planar shape and an exterior portion that conforms to a curved interior surface of a housing, and forming a battery from the shaped conducting porous structure.

A 20$^{th}$ example includes the elements of the 19$^{th}$ example, further including creating a hole in the conducting porous structure while in the substantially planar shape.

A 21$^{st}$ example includes the elements of the 19$^{th}$ example, where the non-planar shape includes a toroidal portion.

A 22$^{nd}$ example includes the elements of the 19$^{th}$ example, where forming the battery includes coating the shaped porous structure with an anode material, an electrolyte material, and a cathode material.

A 23$^{rd}$ example is an apparatus including means to perform the method of any one of examples 19 to 22.

24$^{th}$ example is an apparatus to perform the method of any one of examples 19 to 22.

A 25$^{th}$ example is an apparatus including means for shaping a conductive mesh to form a shaped conductive mesh by plastic deformation of the conductive mesh from a first shape that is substantially planar to a second shape that includes a curved portion to form a shaped conductive mesh, where upon the plastic deformation from the first shape to the second shape the shaped conductive mesh remains in the second shape. The apparatus also includes means for forming a battery from the shaped conductive mesh.

A 26$^{th}$ example includes the elements of the 25$^{th}$ example, where the means for shaping the conductive mesh includes means for deforming the conductive mesh to conform to a surface of a three-dimensional mold having a selected shape that includes a non-cylindrical curved portion.

A 27$^{th}$ example includes the elements of the 26$^{th}$ example, where the surface is a convex surface of the three-dimensional mold.

A 28$^{th}$ example includes the elements of the 26$^{th}$ example, where the surface is a concave surface of the three-dimensional mold.

A 29$^{th}$ example includes the elements of the 25$^{th}$ example, where the second shape is selected to conform to an enclosure within which the battery is to be installed.

A 30$^{st}$ example includes the elements of the 29$^{th}$ example, where the means for shaping the conductive mesh further includes means for forming a hole in the substantially planar conductive mesh.

A 31$^{nd}$ example includes the elements of the 30$^{th}$ example, where the hole is placed to accommodate a protuberance in the enclosure.

A 32$^{rd}$ example includes the elements of the 25$^{th}$ example, where the means for shaping the conductive mesh includes means for forming a tapered thickness of the conductive mesh, where a first thickness of the conductive mesh at a first edge of the conductive mesh differs from a second thickness of the conductive mesh at a second edge of the conductive mesh.

A 33$^{th}$ example includes the elements of the 25$^{th}$ example, where the second shape includes a toroidal portion.

A 34$^{th}$ example includes the elements of the 25$^{th}$ example, where the means for shaping the conductive mesh includes means for introducing a non-uniformity into a thickness dimension of a portion of the conductive mesh.

A 35$^{th}$ example includes the elements of any one of the 25$^{th}$ example to the 34$^{th}$ example, where the means for forming the shaped battery includes means for affixing anode material, electrolyte, and cathode material to the shaped conductive mesh and means for enclosing in a battery housing the shaped conductive mesh with the anode material, the electrolyte, and the cathode material affixed.

A 36$^{th}$ example is an apparatus including means for forming a shaped conducting porous structure by plastically deforming a conducting porous structure from a substantially planar shape to a non-planar shape having an exterior portion that conforms to a curved interior surface of a housing, and means for forming a battery from the shaped conducting porous structure.

A 37$^{th}$ example includes the elements of the 36$^{th}$ example, further including means for creating a hole in the conducting porous structure while in the substantially planar shape.

A 38$^{th}$ example includes the elements of the 36$^{th}$ example, where the non-planar shape includes a toroidal portion.

A 39$^{th}$ example includes the elements of any one of the 36$^{th}$ example to the 38$^{th}$ example, where the means for forming the battery includes means for coating the shaped porous structure with an anode material, an electrolyte material, and a cathode material.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
shaping a conductive mesh to form a shaped conductive mesh by plastic deformation of the conductive mesh from a first shape that is substantially planar to a second shape that includes a curved portion, wherein upon the plastic deformation from the first shape to the second shape the shaped conductive mesh remains in the second shape;
after shaping the conductive mesh, forming a battery from the shaped conductive mesh, wherein the second shape includes a toroidal portion.

2. The method of claim 1, wherein forming the shaped battery includes affixing anode material, electrolyte, and cathode material to the shaped conductive mesh and enclosing in a battery housing the shaped conductive mesh with the anode material, the electrolyte, and the cathode material affixed.

3. The method of claim 1, wherein shaping the conductive mesh includes deforming the conductive mesh to conform to a surface of a three-dimensional mold having a selected shape that includes a non-cylindrical curved portion.

4. The method of claim 3, wherein the surface is a convex surface of the three-dimensional mold.

5. The method of claim 3, wherein the surface is a concave surface of the three-dimensional mold.

6. The method of claim 1, wherein the second shape is selected to conform to an enclosure within which the battery is to be installed.

7. The method of claim 6, wherein shaping the conductive mesh further comprises forming a hole in the substantially planar conductive mesh.

8. The method of claim 7, wherein the hole is placed to accommodate a protuberance in the enclosure.

9. The method of claim 1, wherein shaping the conductive mesh includes forming a tapered thickness of the conductive mesh, wherein a first thickness of the conductive mesh at a first edge of the conductive mesh differs from a second thickness of the conductive mesh at a second edge of the conductive mesh.

10. The method of claim 1, wherein shaping comprises introducing a non-uniformity into a thickness dimension of a portion of the conductive mesh.

11. A method comprising:
forming a shaped conducting porous structure by plastically deforming a conducting porous structure from a substantially planar shape to a non-planar shape having an exterior portion that conforms to a curved interior surface of a housing; and
forming a battery from the shaped conducting porous structure, wherein the non-planar shape includes a toroidal portion.

12. The method of claim 11, wherein forming the battery includes coating the shaped porous structure with an anode material, an electrolyte material, and a cathode material.

13. The method of claim 11, further comprising creating a hole in the conducting porous structure while the conducting porous structure is in the substantially planar shape.

14. A method comprising:
providing a conductive mesh;
providing a mold;
shaping the conductive mesh to form a shaped conductive mesh by plastic deformation of the conductive mesh from a first shape that is substantially planar to a second shape to substantially conform to a shape of the mold, the second shape including a curved portion, wherein upon the plastic deformation from the first shape to the second shape the shaped conductive mesh remains in the second shape, wherein the second shape includes a toroidal portion; and
after shaping the conductive mesh, forming a battery from the shaped conductive mesh.

15. The method of claim 14, wherein forming the shaped battery includes affixing anode material, electrolyte, and cathode material to the shaped conductive mesh and enclosing in a battery housing the shaped conductive mesh with the anode material, the electrolyte, and the cathode material affixed.

16. The method of claim 14, wherein the mold is a three-dimensional mold, and shaping the conductive mesh includes deforming the conductive mesh to conform to the surface of a three-dimensional mold having a selected shape that includes a non-cylindrical portion.

17. The method of claim 16, wherein the surface is a convex surface of the three-dimensional mold.

18. The method of claim 16, wherein the surface is a concave surface of the three-dimensional mold.

* * * * *